(12) United States Patent
Shibutani

(10) Patent No.: US 11,571,784 B2
(45) Date of Patent: Feb. 7, 2023

(54) OPTICAL FIBER FERRULE POLISHING HOLDER

(71) Applicant: SEIKOH GIKEN Co., Ltd., Matsudo (JP)

(72) Inventor: Yuji Shibutani, Matsudo (JP)

(73) Assignee: SEIKOH GIKEN Co., Ltd., Matsudo (JP)

( * ) Notice: Subject to any disclaimer, the term of this patent is extended or adjusted under 35 U.S.C. 154(b) by 675 days.

(21) Appl. No.: 16/699,734

(22) Filed: Dec. 2, 2019

(65) Prior Publication Data

US 2020/0306926 A1 Oct. 1, 2020

(30) Foreign Application Priority Data

Mar. 28, 2019 (JP) .............................. JP2019-063350

(51) Int. Cl.
  *B24B 41/06* (2012.01)
  *B24B 29/08* (2006.01)
  *G02B 6/38* (2006.01)
(52) U.S. Cl.
  CPC .............. *B24B 41/06* (2013.01); *B24B 29/08* (2013.01); *G02B 6/3863* (2013.01)
(58) Field of Classification Search
  CPC ....... B24B 41/06; B24B 29/08; B24B 19/226; B24B 19/00; G02B 6/3863
  See application file for complete search history.

(56) References Cited

U.S. PATENT DOCUMENTS

| 2004/0110455 | A1 | 6/2004 | Yamada et al. |
| 2012/0082419 | A1 | 4/2012 | Koreeda |
| 2019/0030681 | A1* | 1/2019 | Shibutani .............. B24B 19/226 |

FOREIGN PATENT DOCUMENTS

| JP | H01-270010 A | 10/1989 |
| JP | 2004-181608 A | 7/2004 |
| JP | 2010-280016 A | 12/2010 |
| WO | 2017/159675 A | 9/2017 |

* cited by examiner

*Primary Examiner* — John Bedtelyon
(74) *Attorney, Agent, or Firm* — Yokoi & Co., U.S.A.; Toshiyuki Yokoi

(57) ABSTRACT

In an optical fiber ferrule polishing holder 20 used for polishing an optical fiber ferrule 30 having a rectangular cross section, the optical fiber ferrule polishing holder 20 having: a body part 21 having an insertion hole 21A into which the optical fiber ferrule 30 can be inserted, the body part 21 being capable of abutting on the optical fiber ferrule 30 at a support wall 21A1 of the insertion hole 21A; and a fixing part 25 (29) having a pressing wall 25B (29B) for pressing the optical fiber ferrule 30 to the support wall 21A1 at a predetermined pressure, wherein the support wall 21A1 is inclined at a predetermined angle with respect to a vertical axis which is vertically extended from a polishing surface 13 of an optical fiber ferrule polishing machine 10, and the support wall 21A1 has a protrusion 21C toward the pressing wall 25B (29B).

6 Claims, 11 Drawing Sheets

OPTICAL FIBER FERRULE POLISHING HOLDER

CROSS-REFERENCES TO RELATED APPLICATIONS

This patent specification is based on Japanese patent application, No. 2019-063350 filed on Mar. 28, 2019 in the Japan Patent Office, the entire contents of which are incorporated by reference herein.

BACKGROUND OF THE INVENTION

1. Field of the Invention

The present invention relates to an optical fiber ferrule polishing holder for holding optical fiber ferrules having a rectangular section when polishing the optical fiber ferrules by an optical fiber ferrule polishing machine.

2. Description of Related Art

In the method of polishing the optical fiber ferrules by the optical fiber ferrule polishing machine, the optical fiber ferrule is inserted into an insertion hole of the optical fiber ferrule polishing holder, the optical fiber ferrule is held in a fixed attitude with respect to a polishing surface of the optical fiber ferrule polishing machine, and the optical fiber ferrule polishing holder is mounted on the optical fiber ferrule polishing machine in that state.

Patent Document 1 discloses the method of fixing the optical fiber ferrule to the optical fiber ferrule polishing holder by pressing a movable member to the optical fiber ferrule by a bolt fastening structure.

Patent document 2 discloses the method of easily fixing the optical fiber ferrule to the optical fiber ferrule polishing holder by pressing a movable member to the optical fiber ferrule by a rod member which is rotatable around a predetermined axis.

[Patent Document 1] Japanese Patent Application Laid-Open No. 2004-181608
[Patent Document 2] PCT International Publication No. WO2017/159675

BRIEF SUMMARY OF THE INVENTION

APC (Angled Physical Contact) polishing which is the method of polishing (angled polishing) an end face of the optical fiber ferrule is conventionally used. In the APC polishing, the optical fiber ferrule is polished with an angle to a vertical axis vertically extended from a polishing surface of the optical fiber ferrule polishing machine. By performing the APC polishing, the end face of the optical fiber ferrule is obliquely inclined and spherically curved. The above described shape is suitable for connecting the optical fiber ferrules with each other. The APC polishing is available both methods of Patent Document 1 and Patent Document 2.

However, a slight recess is formed on a side surface of the optical fiber ferrule in some cases. If the recess is formed on the side surface of the optical fiber ferrule, when a movable member is pressed to the optical fiber ferrule for fixing the optical fiber ferrule, the recess is pressed to the inner wall of the insertion hole and the bending occurs on the optical fiber ferrule as a whole in some cases. When the optical fiber ferrule is angle polished in a state that the optical fiber ferrule is bent, the shape of the end face of the optical fiber ferrule may be recessed after the optical fiber ferrule is detached from the optical fiber ferrule polishing holder and the bending of the optical fiber ferrule is eliminated. The above described shape is not suitable for connecting the optical fiber ferrules with each other.

Conventionally, for solving the above described problem, the pressure for pressing the movable member to the optical fiber ferrule was adjusted independently for preventing the optical fiber ferrule from being bent. However, the recess of the optical fiber ferrule varies individually. Thus, workability is deteriorated if the pressure is adjusted individually.

The present invention provides an optical fiber ferrule polishing holder capable of suppressing the bending of the optical fiber ferrule regardless of the individual difference of the recess of the optical fiber ferrule even when the optical fiber ferrule is pressed by a constant pressure.

An optical fiber ferrule polishing holder of the present invention is mounted on an optical fiber ferrule polishing machine and used for polishing an optical fiber ferrule having a rectangular cross section, the optical fiber ferrule polishing holder having: a body part having an insertion hole into which the optical fiber ferrule can be inserted, the body part being capable of abutting on the optical fiber ferrule at a support wall of the insertion hole; and a fixing part having a pressing wall for pressing the optical fiber ferrule to the support wall at a predetermined pressure, wherein the support wall is inclined at a predetermined angle with respect to a vertical axis which is vertically extended from a polishing surface of the optical fiber ferrule polishing machine, and the support wall has a protrusion toward the pressing wall.

In the above described configuration, it is preferred that a protrusion height of the protrusion is 0.001 mm to 0.026 mm.

In the above described configuration, it is preferred that the protrusion is located at a center of the support wall when viewed from an upper surface. The upper surface means the upper surface when the side surface of the insertion hole is defined as the front surface.

In the above described configuration, the support wall can have an arc-shaped cross section or a quadratic curve-shaped cross section when viewed from an upper surface.

In the above described configuration, the fixing part can have a movable member which is movable along a predetermined path by a bolt fastening structure, and the optical fiber ferrule can be pressed to the support wall at the predetermined pressure or released from the support wall by a movement of the movable member.

In the above described configuration, the fixing part can have a rod member which is movable between a first member and a second member; and a movable member moved by the rod member, and the movable member can press the optical fiber ferrule to the support wall when the rod member is located at the first position, and the optical fiber ferrule can be released from the support wall when the rod member is located at the second position.

By using the optical fiber ferrule polishing holder of the present invention, when the APC polishing is performed, the bending of the optical fiber ferrule can be suppressed regardless of the individual difference of the recess of the optical fiber ferrule even when the optical fiber ferrule is pressed by a constant pressure.

DETAILED DESCRIPTION OF THE INVENTION

Hereafter, the embodiments of the present invention will be explained with reference to illustratively shown drawings.

Figure 1:
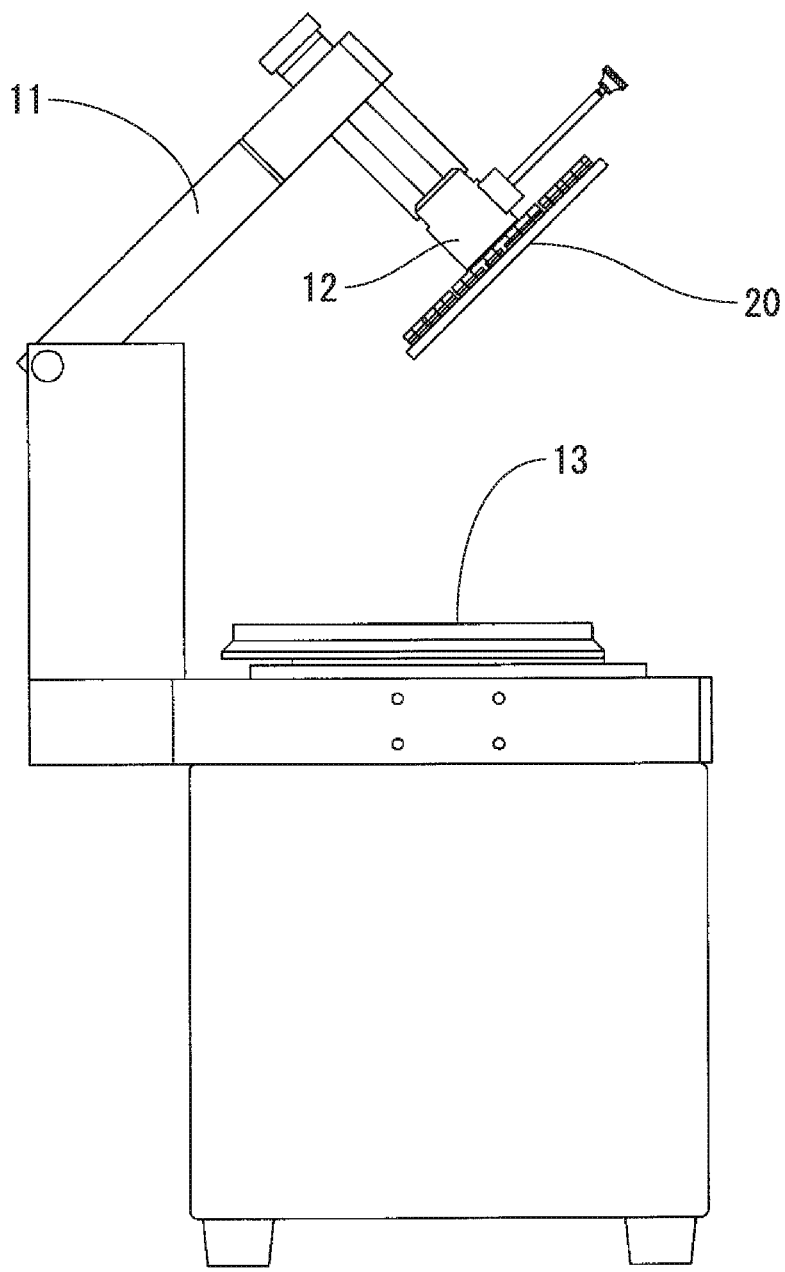
FIG. 1 is a side view showing a state that an optical fiber ferrule polishing holder is mounted on an optical fiber ferrule polishing machine.

FIG. 1 is a side view showing a state that an optical fiber ferrule polishing holder 20 is mounted on an optical fiber ferrule polishing machine 10. The optical fiber ferrule polishing machine 10 has a pivot arm 11, a holder mounting part 12 and a polishing surface 13. The pivot arm 11 is rotatable around a predetermined axis between a polishing position which is parallel to the polishing surface 13 and an attaching/detaching position which is upper than the polishing position. The holder mounting part 12 is provided on an opposite side of the axis of the pivot arm 11. The holder mounting part 12 has a structure of attaching and detaching the optical fiber ferrule polishing holder 20. The optical fiber ferrule polishing holder 20 has a structure of fixing an optical fiber ferrule 30 as explained later.

When the optical fiber ferrule 30 is attached to the optical fiber ferrule polishing holder 20 or detached from the optical fiber ferrule polishing holder 20, the pivot arm 11 is moved to the attaching/detaching position and then the optical fiber ferrule polishing holder 20 is attached to or detached from the optical fiber ferrule polishing machine 10. When the optical fiber ferrule is polished, the optical fiber ferrule polishing holder 20 is mounted on the optical fiber ferrule polishing machine 10, and then the pivot arm 11 is rotated to the polishing position. Thus, the optical fiber ferrule polishing holder 20 is approached to the polishing surface 13. Consequently, the end surface of the optical fiber ferrule 30 projected from the lower surface of the optical fiber ferrule polishing holder 20 is polished by the polishing surface 13. The lower surface means the lower surface when the side surface of the insertion hole is defined as the front surface. The detailed explanation of the optical fiber ferrule polishing machine 10 is omitted.

Figure 2:
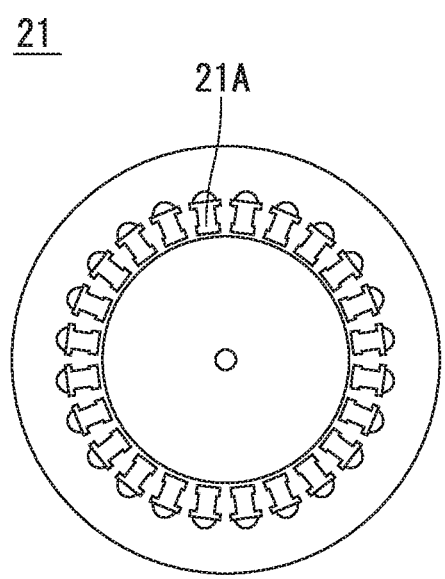
FIG. 2 is a plan view of a body part of the optical fiber ferrule polishing holder.

FIG. 2 is a plan view of a body part 21 of the optical fiber ferrule polishing holder 20. The body part 21 is formed in a circular plate shape. A plurality of insertion holes 21A is formed on the body part 21 to insert the optical fiber ferrules 30 into the insertion holes 21A. The insertion holes 21A are concentrically arranged around the approximate center of the body part 21 at a constant interval. Each of the insertion holes 21A penetrates thorough the body part 21 in a plate thickness direction. The structure of each of the insertion holes 21A will be explained later. A fixing structure for fixing the optical fiber ferrule 30 is arranged on each of the insertion holes 21A.

Figure 3:
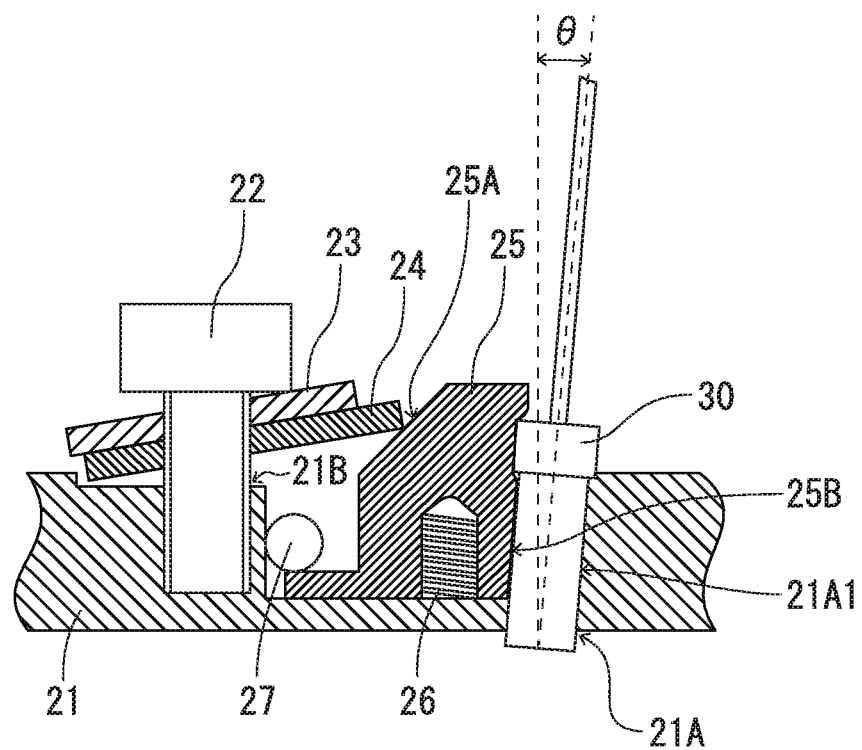
FIG. 3 is a cross-sectional view showing an example of a fixing structure for fixing an optical fiber ferrule to the optical fiber ferrule polishing holder.

FIG. 3 is a cross-sectional view showing an example of a fixing structure for fixing an optical fiber ferrule 30 to the optical fiber ferrule polishing holder 20. The fixing structure is formed by a body part 21, a bolt 22, a washer 23, a fastening member 24, a movable member 25, a spring 26 and a stopper 27. The bolt 22 is screwed into a bolt hole 21B formed on the body part 21. The washer 23 and the fastening member 24 are inserted between the bolt 22 and the body part 21. The movable member 25 is arranged between the insertion hole 21A and the bolt hole 21B. The movable member 25 is horizontally movable along a predetermined path. In addition, the movable member 25 is energized in the upper surface direction of the body part 21 by the spring 26. Namely, the movable member 25 is energized in the direction of releasing the fixture of the optical fiber ferrule 30. The movable member 25 has an inclined surface 25A on the upper surface. The height of the inclined surface 25A is gradually reduced from an approximate center to the bolt holes 21B side. One end of the fastening member 24 is arranged above the inclined surface 25A.

When the optical fiber ferrule 30 is inserted into the insertion hole 21A, the optical fiber ferrule 30 is located between a support wall 21A1 of the insertion hole 21A and a pressing wall 25B of the movable member 25. When the bolt 22 is tightened to the bolt hole 21B in a state that the optical fiber ferrule 30 is inserted into the insertion hole 21A, the bolt 22 presses the fastening member 24 downward via the washer 23. Consequently, one end of the fastening member 24 presses the inclined surface 25A downward. When the inclined surface 25A is pressed downward, the movable member 25 is pressed downward in the vertical direction against the energizing force of the spring 26 and also pressed in the horizontal direction since the inclined surface 25A is inclined. Consequently, the optical fiber ferrule 30 is pressed at a predetermined pressure by the pressing wall 25B toward the support wall 21A1 to fix the optical fiber ferrule 30 to the insertion hole 21A. When the bolt 22 is loosened from the bolt hole 21B, the bolt 22 is moved upward and the pressing force to press the fastening member 24 downward by the bolt 22 is released. Consequently, the pressing force to press the movable member 25 by the fastening member 24 is released, and the fixing of the optical fiber ferrule 30 is released by the energizing force of the spring 26. The stopper 27 prevents the movable member 25 to move in the release direction more than the predetermined path. As explained above, the optical fiber ferrule 30 can be pressed to the support wall 21A1 at the predetermined pressure or released from the support wall 21A1 by the movement of the movable member 25. In the above described fixing structure, the predetermined pressure can be adjusted by a degree of fastening the bolt 22 to the bolt hole 21B.

In the above described embodiment, the movable member 25 corresponds to the fixing part, and the bolt 22, the washer 23 and the fastening member 24 correspond to the bolt fastening structure.

When the optical fiber ferrule 30 is fixed to each of the insertion holes 21A, a tip of the optical fiber ferrule 30 is slightly projected from the lower surface of the body part 21. In addition, the optical fiber ferrule 30 is inclined at a predetermined angle θ with respect to a vertical axis which is vertically extended from the lower surface of the body part 21. Namely, when the optical fiber ferrule polishing holder is installed on the optical fiber ferrule polishing machine 10, the optical fiber ferrule 30 is inclined at the predetermined angle θ with respect to a vertical axis which is vertically extended from the polishing surface 13. The predetermined angle θ is normally 8°.

Figure 4:
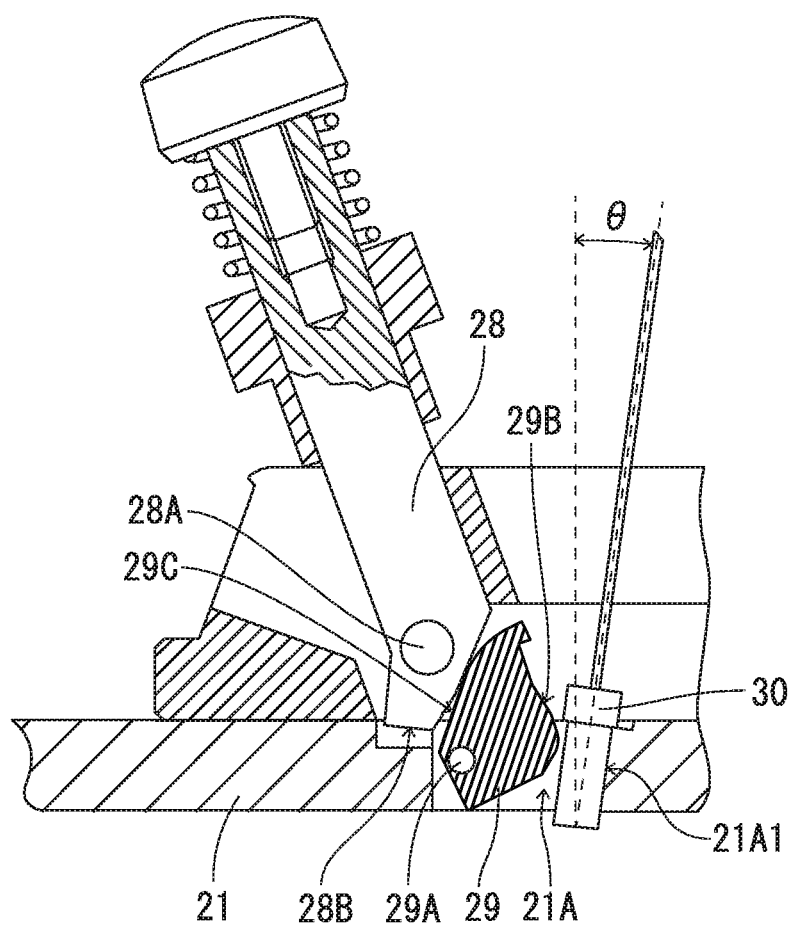
FIG. 4 is a cross-sectional view showing another example of the fixing structure for fixing the optical fiber ferrule to the optical fiber ferrule polishing holder.
Figure 5:
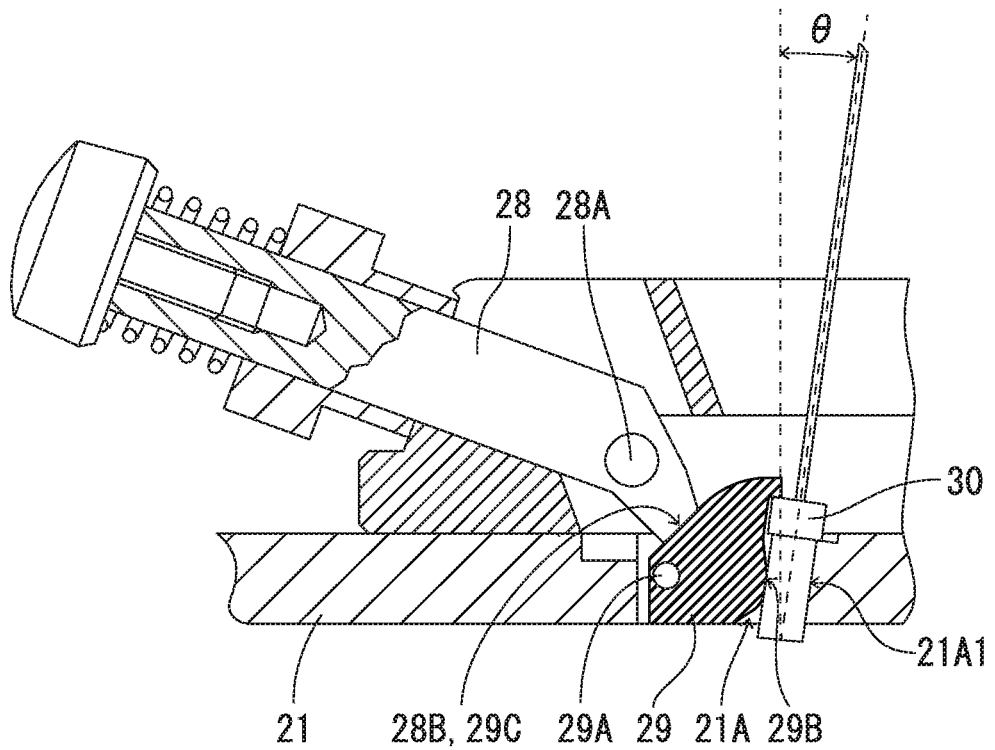
FIG. 5 is a cross-sectional view showing another example of the fixing structure for fixing the optical fiber ferrule to the optical fiber ferrule polishing holder.

FIG. 4 and FIG. 5 are cross-sectional views showing another example of a fixing structure for fixing the optical fiber ferrule 30 to the optical fiber ferrule polishing holder 20. FIG. 4 shows the released state of the optical fiber ferrule 30, and FIG. 5 shows a fixed state of the optical fiber ferrule 30. The fixing structure is formed by a body part 21, a rod member 28 and a movable member 29. The rod member 28 is arranged above the body part 21 and rotatable around a predetermined axis 28A with respect to the body part 21. The rod member 28 is formed to be movable between a raised position (first position) shown in FIG. 4 and an inclined position (second position) shown in FIG. 5. The movable member 29 is arranged inside the insertion hole 21A or arranged on a portion adjacent to insertion hole 21A. The movable member 29 is formed to be rotatable around a predetermined axis 29A with respect to the body part 21. The movable member 29 has an inclined surface 29C on the upper surface. At the inclined portion, the height of the inclined surface 29C is gradually reduced from an approximate center to the axis 29A side. An inclined surface 28B is formed on a lower end portion of the rod member 28. The inclined portion of the inclined surface 28B can be in contact with the inclined surface 29C so as to be approximately parallel with the inclined surface 29C. Consequently, the inclined surface 28B is not in contact with the inclined surface 29C in the released state, but the inclined surface 28B is in contact with the inclined surface 29C to press the inclined surface 29C in the fixed state. Although it is not illustrated, same as the fixing structure shown in FIG. 3, the movable member 29 is energized in the upper surface direction of the body part 21 by the spring. Namely, the movable member 29 is energized in the direction of releasing the fixture of the optical fiber ferrule 30.

When the optical fiber ferrule 30 is inserted into the insertion hole 21A, the optical fiber ferrule 30 is located between the support wall 21A1 of the insertion hole 21A and a pressing wall 29B of the movable member 29. When the rod member 28 is rotated from the raised state to the inclined state in a state that the optical fiber ferrule 30 is inserted into the insertion hole 21A, the inclined surface 28B of the rod member 28 presses the inclined surface 29C toward the optical fiber ferrule 30. When the inclined surface 29C is pressed toward the optical fiber ferrule 30, the movable member 29 is rotated in a clockwise direction around the axis 29A against the energizing force of the spring. Consequently, the optical fiber ferrule 30 is pressed toward the support wall 21A1 by the pressing wall 29B at a predetermined pressure to fix the optical fiber ferrule 30 to the insertion hole 21A. When the rod member 28 is rotated from the inclined state to the raised state, the pressing force to press the movable member 29 by the rod member 28 is released, and the fixing of the optical fiber ferrule 30 is released by the energizing force of the spring. As explained above, the movable member 29 is moved by the rod member 28 to press the optical fiber ferrule 30 to the support wall 21A1 when the rod member 28 is located at the first position, and the optical fiber ferrule 30 is released from the support wall 21A1 when the rod member 28 is located at the second position. In the above described fixing structure, the predetermined pressure is preliminarily determined by the positional relation of the rod member 28 and the movable member 29 and other conditions.

In the above described embodiment, the movable member 29 corresponds to the fixing part.

When the optical fiber ferrule 30 is fixed to each of the insertion holes 21A, a tip of the optical fiber ferrule 30 is slightly projected from the lower surface of the body part 21. In addition, the optical fiber ferrule 30 is inclined at a predetermined angle θ with respect to a vertical axis which is vertically extended from the lower surface of the body part 21. Namely, when the optical fiber ferrule polishing holder is installed on the optical fiber ferrule polishing machine 10, the optical fiber ferrule 30 is inclined at the predetermined angle θ with respect to a vertical axis which is vertically extended from the polishing surface 13. The predetermined angle θ is normally 8°.

Hereafter, the structure of the insertion hole 21A will be explained. The structure of the insertion hole 21A explained below can be commonly applied to the optical fiber ferrule polishing holder 20 shown in FIG. 3 and the optical fiber ferrule polishing holder 20 shown in FIG. 4 and FIG. 5.

Figure 6:
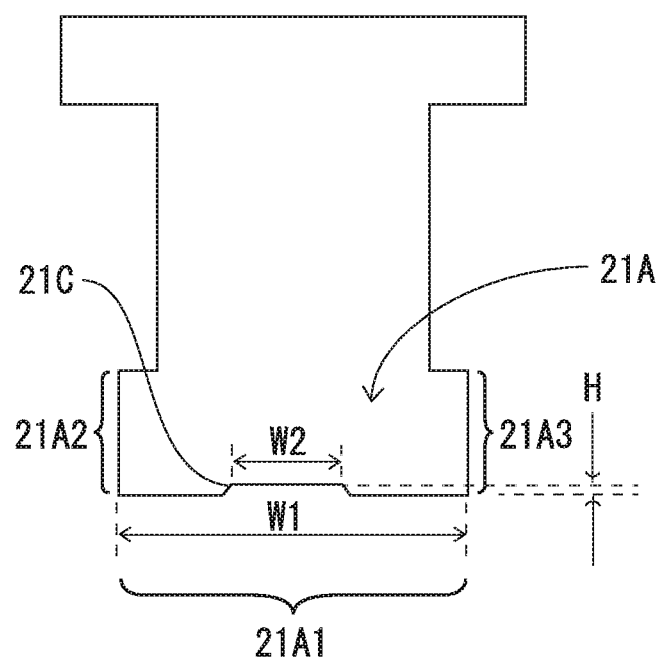
FIG. 6 is an enlarged plan view showing an example of an insertion hole of the optical fiber ferrule polishing holder.

FIG. 6 is an enlarged plan view showing an example of the insertion hole 21A of the optical fiber ferrule polishing holder 20. A plurality of insertion holes 21A is formed on the body part 21. In the insertion hole 21A, an approximately rectangular shaped portion surrounded by the support wall 21A1 and side walls 21A2, 21A3 is the portion into which the optical fiber ferrule 30 is inserted. The rest of the insertion hole 21A is the portion on which the fixing structure is arranged. As shown in FIG. 6, a protrusion 21C is formed on the support wall 21A1. When the pressing wall 25B of the movable member 25 presses one surface of the optical fiber ferrule 30, an opposite surface of the optical fiber ferrule 30 is pressed to the inner wall of the insertion hole 21A. Here, the support wall 21A1 is the inner wall to which the opposite surface of the optical fiber ferrule 30 is pressed. Namely, the body part 21 abuts on the optical fiber ferrule 30 at the support wall 21A1 of the insertion hole 21A.

Figure 11:
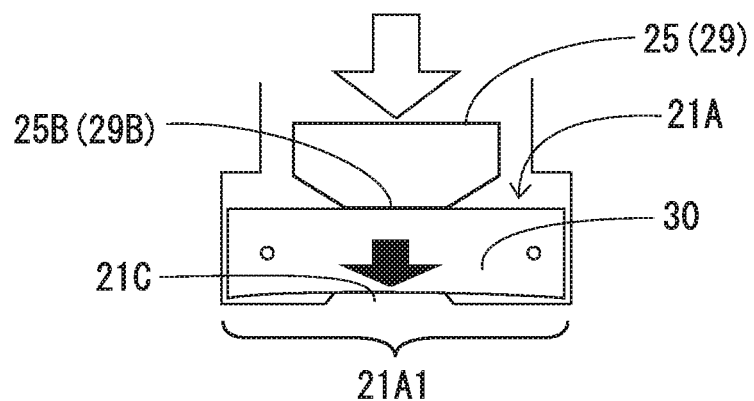
FIG. 11 is a schematic view showing a holding structure of the optical fiber ferrule in the optical fiber ferrule polishing holder of the present invention.

The protrusion 21C is a portion where a part of the support wall 21A1 is protruded toward the opposite inner wall. As shown in FIG. 11, in a state that the movable member 25 (29) is arranged on the insertion hole 21A, the protrusion 21C is protruded (projected) toward the pressing wall 25B (29B).

The protrusion 21C is protruded at a predetermined height (protrusion height) H. The predetermined height H is preferably within the range of 0.001 mm to 0.026 mm. If the predetermined height H exceeds the above described upper limit value, it is not preferable because the spherical shape (round shape) of the end surface of the optical fiber ferrule 30 is not enough after the polishing. If the predetermined height H is below the above described lower limit value, it is not preferable because the effect of the protrusion 21C cannot be fully performed.

The protrusion 21C is formed over a predetermined width W2 in an entire width W1 of the support wall 21A1. In the present embodiment, the entire width W1 is specified to 6.5 mm and the predetermined width W2 is specified to 2.0 mm.

The entire width W1 is specified to be slightly wider than the width of the optical fiber ferrule 30. Consequently, when the optical fiber ferrule 30 is inserted into the insertion hole 21A, the optical fiber ferrule 30 can be positioned by surrounding it by the support wall 21A1 and the side walls 21A2, 21A3. The predetermined width W2 is preferably within the range of 0.5 mm to 4.0 mm. If the predetermined width W2 exceeds the above described upper limit value, it is not preferable because the bending of the optical fiber ferrule 30 may occur when the recess of the optical fiber ferrule 30 is pressed to the protrusion 21C. If the predetermined width W2 is below the above described lower limit value, it is not preferable because the effect of the protrusion 21C cannot be fully performed.

The protrusion 21C is preferably located at the center of the support wall 21A1 when viewed from an upper surface of the optical fiber ferrule polishing holder 20. The center does not necessarily mean the position where the distances from both ends of the support wall 21A1 are exactly the same. It is enough if the protrusion 21C is located at an approximately center of the optical fiber ferrule 30 when the optical fiber ferrule 30 is inserted. In addition, it is not necessary to locate the center of the protrusion 21C at the center of the support wall 21A1. It is enough if at least a part of the protrusion 21C is located at the center of the support wall 21A1.

The protrusion 21C can be partly protruded to the height (protrusion height) H direction in a vertical direction of the support wall 21A1. Namely, it is possible to form the protrusion 21C only at a portion to be in contact with the optical fiber ferrule 30. On the other hand, the protrusion 21C can be entirely protruded to the height (protrusion height) H direction in the vertical direction of the support wall 21A1. The vertical direction is the direction directed from the upper surface to the lower surface or directed from the lower surface to the upper surface when the side surface of the insertion hole is defined as the front surface. Furthermore, it is also possible that the protrusion 21C is formed to have the same (constant) cross-sectional shape from the upper surface to the lower surface.

Figure 7:
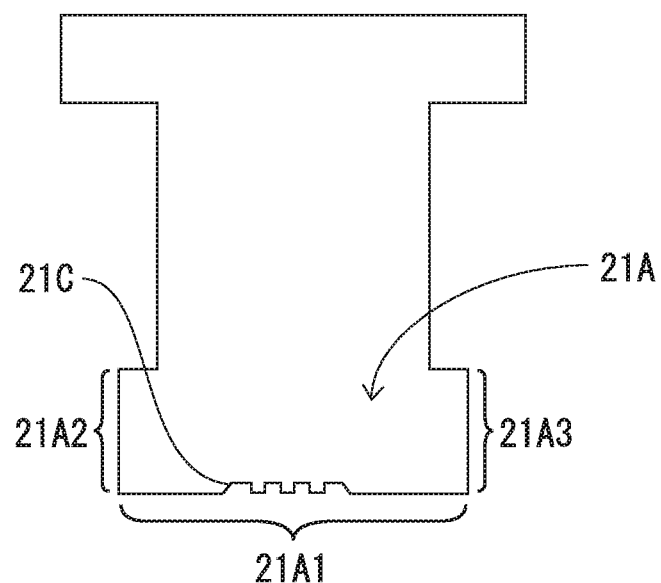
FIG. 7 is an enlarged plan view showing another example of an insertion hole of the optical fiber ferrule polishing holder.

FIG. 7 is an enlarged plan view showing another example of the insertion hole 21A of the optical fiber ferrule polishing holder 20. As shown in FIG. 7, the protrusion 21C can have a recess at the surface to be in contact with the optical fiber ferrule 30. It is enough to form the protruded shape from the support wall 21A1 to the pressing wall 25B (29B) as a whole of the protrusion 21C. When the depth of the recess of the protrusion 21C is approximately same as the height H, it is said that the protrusion 21C is formed by a plurality of protrusions having a narrower width. Such a structure is also possible.

Figure 8:
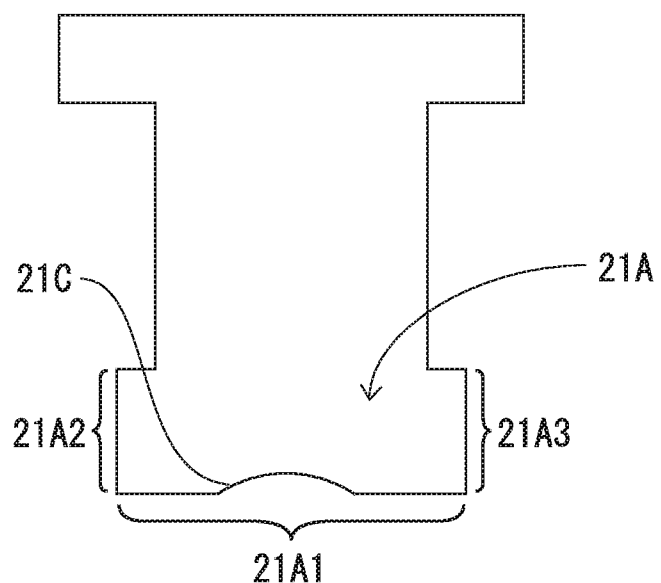
FIG. 8 is an enlarged plan view showing another example of an insertion hole of the optical fiber ferrule polishing holder.

FIG. 8 is an enlarged plan view showing another example of the insertion hole 21A of the optical fiber ferrule polishing holder 20. As shown in FIG. 8, the protrusion 21C can have an arc-shaped cross section when viewed from the upper surface. The arc-shape is not limited to an arc of a precise circle. An arc of an ellipse and other rounded shape are also possible. In addition, the protrusion 21C can have a various quadratic curve-shaped cross sections.

Figure 9:
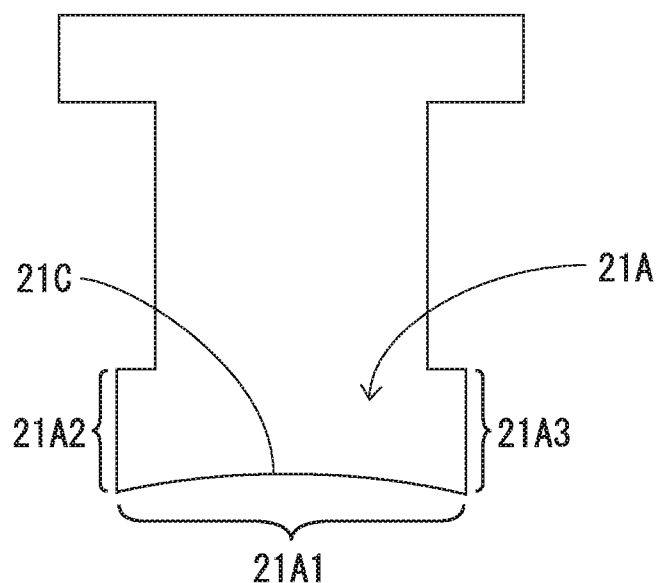
FIG. 9 is an enlarged plan view showing another example of an insertion hole of the optical fiber ferrule polishing holder.

FIG. 9 is an enlarged plan view showing another example of the insertion hole 21A of the optical fiber ferrule polishing holder 20. As shown in FIG. 9, the protrusion 21C can have an arc-shaped cross section or a quadratic curve-shaped cross section gradually protruded from both ends of the support wall 21A1. Namely, in the protrusion 21C having an arc-shaped cross section or a quadratic curve-shaped cross section, the protrusion 21C can be formed over the entire width W1 of the support wall 21A1. In the protrusion 21C shown in FIG. 8 and FIG. 9, the protrusion 21C can have a recess at the surface to be in contact with the optical fiber ferrule 30, similar to the example shown in FIG. 7.

Figure 10:
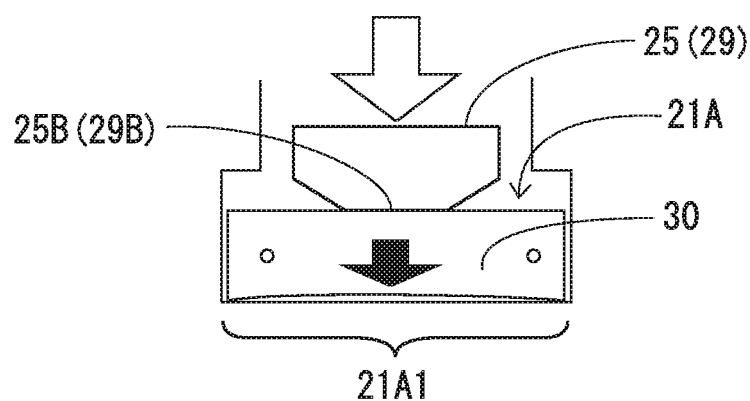
FIG. 10 is a schematic view showing a holding structure of the optical fiber ferrule in the conventional optical fiber ferrule polishing holder.

FIG. 10 and FIG. 11 are schematic views showing a holding structure of the optical fiber ferrule 30. A protrusion is not formed in the conventional optical fiber ferrule polishing holder shown in FIG. 10. On the other hand, the protrusion 21C is formed on the optical fiber ferrule polishing holder 20 shown in FIG. 11. As an example, the explanation will be made by using the case of fixing the optical fiber ferrule 30 having a recess at the center. For making the explanation easier, the shape of the optical fiber ferrule 30 is exaggeratedly drawn in some parts of FIG. 10 and FIG. 11.

As shown in FIG. 10, in the conventional optical fiber ferrule polishing holder, when the optical fiber ferrule 30 has a recess at the center and the pressing wall 25B (29B) of the movable member 25 (29) presses the optical fiber ferrule 30 having a rectangular cross section, the recess of the optical fiber ferrule 30 is pressed until the recess is approximately in contact with the support wall 21A1. Consequently, the optical fiber ferrule 30 is bent. Namely, the optical fiber ferrule 30 is bent in an arc shape when viewed from the upper surface. When the optical fiber ferrule 30 is angle polished in a state that the optical fiber ferrule 30 is bent, the shape of the end face of the optical fiber ferrule 30 may be recessed after the optical fiber ferrule 30 is detached from the optical fiber ferrule polishing holder 20 and the bending of the optical fiber ferrule 30 is eliminated. The above described shape is not suitable for connecting the optical fiber ferrules with each other.

As shown in FIG. 11, in the optical fiber ferrule polishing holder 20 of the present invention, the protrusion 21C is formed on the support wall 21A1. Thus, the recess of the optical fiber ferrule 30 is in contact with the protrusion 21C before the recess is in contact with the support wall 21A1. Consequently, the optical fiber ferrule 30 is not further bent. Namely, before the optical fiber ferrule 30 is bent in an arc shape in a top view, the optical fiber ferrule 30 is fixed by being sandwiched by the movable member 25 (29) and the support wall 21A1. Even when the recess is not formed on the optical fiber ferrule 30, the optical fiber ferrule 30 is fixed by being sandwiched by the movable member 25 (29) and the protrusion 21C of the support wall 21A1. Thus, the protrusion 21C does not affect the polishing operation negatively. In the fixing structure shown in FIG. 4 and FIG. 5, the pressure of fixing the optical fiber ferrule 30 by the pressing wall 29B is preliminarily set to a predetermined value. Thus, the structure of the present invention is especially effective for such a fixing structure since the bending can be suppressed even when the optical fiber ferrule is pressed by the predetermined pressure.

In the above described embodiments, a plurality of insertion holes 21A are concentrically arranged around the approximate center of the body part 21. However, it is not necessary to arrange the insertion holes 21A concentrically. The insertion holes 21A can be arranged linearly, randomly or arranged in a lattice shape. In addition, it is not necessary to arrange the insertion holes 21A at a constant interval.

In the above described embodiments, the fixing structures of FIG. 3, FIG. 4 and FIG. 5 are used as an example of the structure of fixing the optical fiber ferrule 30 to the optical fiber ferrule polishing holder 20. However, the fixing structure is not limited to these examples. The structure of the insertion hole 21A of the present invention is applicable as long as the optical fiber ferrule having a rectangular cross section is fixed.

The shapes of the protrusion 21C exemplified in the above described embodiments are merely an example of the shape of the protrusion 21C. The other shapes can be used for the protrusion 21C as long as the protrusion 21C is protruded toward the pressing wall 25B (29B).

Note that, this invention is not limited to the above-mentioned embodiments.

Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

DESCRIPTION OF THE REFERENCE NUMERALS 10 optical fiber ferrule polishing machine
11 pivot arm
12 holder mounting part
13 polishing surface
20 optical fiber ferrule polishing holder
21 body part
21A insertion hole
21A1 support wall
21A2 side wall
21A3 side wall
21B bolt hole
21C protrusion
22 bolt
23 washer
24 fastening member
25 movable member
25A inclined surface
25B pressing wall
26 spring
27 stopper
28 rod member
28A axis
28B inclined surface
29 movable member
29A axis
29B pressing wall
29C inclined surface
30 optical fiber ferrule

What is claimed is:

1. An optical fiber ferrule polishing holder mounted on an optical fiber ferrule polishing machine and used for polishing an optical fiber ferrule having a rectangular cross section, the optical fiber ferrule polishing holder comprising:
a body part having an insertion hole into which the optical fiber ferrule can be inserted, the body part being capable of abutting on the optical fiber ferrule at a support wall of the insertion hole; and
a fixing part having a pressing wall for pressing the optical fiber ferrule to the support wall at a predetermined pressure, wherein
the support wall is inclined at a predetermined angle with respect to a vertical axis which is vertically extended from a polishing surface of the optical fiber ferrule polishing machine, and
the support wall has a protrusion toward the pressing wall at a predetermined protrusion height from a not protruded portion of the support wall.

2. The optical fiber ferrule polishing holder according to claim 1, wherein
the predetermined protrusion height of the protrusion is 0.001 mm to 0.026 mm.

3. The optical fiber ferrule polishing holder according to claim 1, wherein
the protrusion is located at a center of the support wall when viewed from an upper surface.

4. The optical fiber ferrule polishing holder according to claim 1, wherein
the support wall has an arc-shaped cross section or a quadratic curve-shaped cross section when viewed from an upper surface.

5. The optical fiber ferrule polishing holder according to claim 1, wherein
the fixing part has a movable member which is movable along a predetermined path by a bolt fastening structure, and
the optical fiber ferrule is pressed to the support wall at the predetermined pressure or released from the support wall by a movement of the movable member.

6. The optical fiber ferrule polishing holder according to claim 1, wherein
the fixing part has a rod member which is movable between a first member and a second member; and a movable member moved by the rod member,
the movable member presses the optical fiber ferrule to the support wall when the rod member is located at the first position, and
the optical fiber ferrule is released from the support wall when the rod member is located at the second position.

* * * * *